United States Patent [19]

Olmstead, Jr. et al.

[11] Patent Number: 4,485,686
[45] Date of Patent: Dec. 4, 1984

[54] GEAR RETAINER

[75] Inventors: Richard E. Olmstead, Jr., Plainwell; Terry E. Teeter, Mattawan, both of Mich.

[73] Assignee: Eaton Corporation, Cleveland, Ohio

[21] Appl. No.: 361,938

[22] Filed: Mar. 25, 1982

[51] Int. Cl.³ .......................... F16H 3/08; F16H 57/00
[52] U.S. Cl. ......................................... 74/331; 74/410
[58] Field of Search ................ 74/331, 333, 339, 325, 74/370, 375, 410, 392, 395, 396, 397, 398, 399; 192/48.91, 109 R

[56] References Cited

U.S. PATENT DOCUMENTS

| | | | |
|---|---|---|---|
| 2,397,905 | 4/1946 | Acton et al. | 192/109 R X |
| 3,105,395 | 10/1963 | Perkins | 74/745 |
| 3,237,472 | 3/1966 | Perkins et al. | 74/410 X |
| 3,283,613 | 11/1966 | Perkins | 74/396 |
| 3,611,823 | 10/1971 | Richards et al. | 74/331 |
| 3,894,621 | 7/1975 | Quick | 192/109 R |
| 4,034,620 | 7/1977 | McNamara et al. | 74/410 |
| 4,423,643 | 1/1984 | McNamara | 74/410 X |

Primary Examiner—Lawrence J. Staab
Assistant Examiner—Bruce F. Wojciechowski
Attorney, Agent, or Firm—C. H. Grace; H. D. Gordon

[57] ABSTRACT

An improved mainshaft gear retainer assembly (66, 68) for a twin countershaft (18, 18A) transmission (10) having at least one pair of floating mainshaft gears (44–46, 48–50) positioned close together in groups of two and clutchable to a mainshaft (40) one at a time by positive clutches (54, 56, 58) is provided. The improved mainshaft gear retainer assembly prevents axial movement of the two closely positioned gears and reacts the axial forces on a clutched one of the mainshaft gears toward and away from the other mainshaft gear to the mainshaft by means of thrust surfaces (78, 124, 126, 128, 130, 132, 134, 136) which are all rotating, or tending to rotate, at the same speed as the clutched mainshaft gear and the mainshaft. The gear retainer comprises relatively simple components and allows easy assembly and disassembly of the mainshaft gears and gear retainers from the mainshaft. Each of the closely spaced mainshaft gears and associated retainer components defines a subassembly (44, 86 and 100 and 46, 92 and 104) which is independently assembled to and removed from the mainshaft assembly (20).

17 Claims, 6 Drawing Figures

GEAR RETAINER

BACKGROUND OF THE INVENTION

1. Field of the Invention

The present invention relates to gear retainer means and more specifically to mainshaft gear retainer means for a transmission having a plurality of substantially identical countershafts and at least one pair of closely axially spaced radially floating mainshaft gears.

2. Description of the Prior Art

Gear retainer means for pairs of closely spaced and radially floating mainshaft gears are known. The prior art devices usually utilized retainer means associated with one of the two closely spaced gears to prevent axial movement of that gear in one direction, movement of that gear in the other direction is prevented by the other gear and its associated retainer and vice versa. When the forces tending to move one of the gears are reacted by the other gear and its associated retainer, the forces must cross retainer surfaces rotating at different speeds; this makes the retainer subject to wear and failure.

An improved gear retainer means for pairs of closely spaced and radially floating mainshaft gears is disclosed in U.S. Pat. No. 4,034,620, assigned to the assignee of this invention and hereby incorporated by reference. This disclosed improved gear retainer means utilizes structure whereby the axial forces tending to move one of the closely spaced mainshaft gears relative to the other mainshaft gear cross reaction surfaces which are rotating at the same speed, namely the speed of the mainshaft gear which is clutched to the mainshaft. While this disclosed structure is highly desirable as it tends to minimize wear and failure of the reaction surfaces, this disclosed structure is not entirely satisfactory as the design utilized a somewhat complicated and expensive to manufacture thrust member and additionally the two closely spaced mainshaft gears are interlocked in a manner making later disassembly thereof difficult and/or impossible.

SUMMARY OF THE INVENTION

In accordance with the present invention, an improved gear retainer means is provided for pairs of closely spaced and floating mainshaft gears which will react the forces tending to axially move the clutched mainshaft gear to the mainshaft through surfaces which are rotating at the same speeds, namely the speed of the mainshaft and gear clutched thereto. The improved gear retaining means utilizes components which are relatively simple and inexpensive to manufacture, which have a high degree of interchangeability and which permit relatively easy assembly and disassembly of the mainshaft-mainshaft gear assembly.

The above is accomplished by providing thrust members axially fixed to the mainshaft and tending to rotate therewith which thrust members will transfer the axial forces acting on the clutched gear to the mainshaft while not applying a significant axial load to any surface rotating with the unclutched one of the closely spaced mainshaft gear pair. Additionally, the gear retainer means will permit relative radial floating of the mainshaft gears relative to the mainshaft and will also permit easy assembly and disassembly of the mainshaft gears from the mainshaft.

Accordingly, it is an object of the present invention to provide an improved gear retainer means for closely spaced and floating mainshaft gears for a transmission having a plurality of substantially identical countershaft assemblies and floating mainshaft gears.

A further object of the present invention is to provide improved gear retainer means for closely spaced and floating mainshaft gears in a transmission having a plurality of substantially identical countershafts wherein the retainer means allow relatively easy assembly and disassembly of the mainshaft gears from the mainshaft.

These and other objects and advantages of the present invention will become apparent from the reading of the detailed description taken in connection with the drawings.

DESCRIPTION OF THE PREFERRED EMBODIMENT

Figure 1:
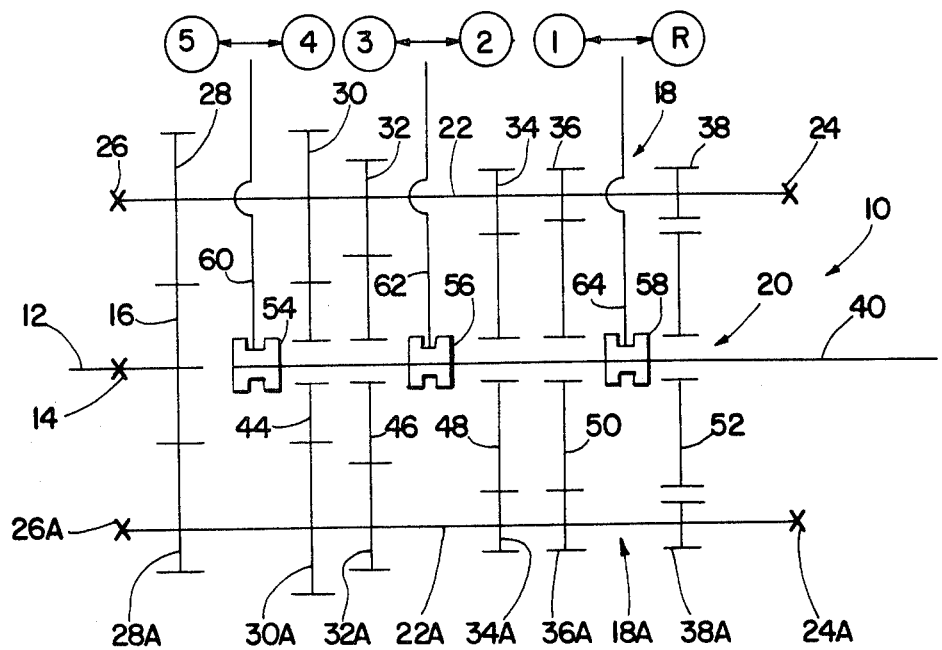
FIG. 1 is a schematic illustration of a five forward speed, single reverse speed twin countershaft, floating mainshaft gear, change gear transmission or main transmission section.

Certain terminology will be used in the following description for convenience in reference only and will not be limiting. The words "upwardly," "downwardly," "rightwardly" and "leftwardly" will designate directions in the drawings to which reference is made. The words "inwardly" and "outwardly" will refer to directions toward and away from, respectively, the geometric center of the device and designated parts thereof. Said terminology will include the words above specifically mentioned, derivatives thereof and words of similar import.

The term "simple transmission" is used to designate a change speed transmission wherein the operator may select one of a plurality of single gear reductions. The term "compound transmission" is used to designate a transmission having a main transmission portion and an auxiliary transmission portion wherein the selected gear reduction in the main transmission portion may be compounded by further selected gear reduction in the auxiliary transmission portion.

Referring now to FIG. 1, there is shown a twin countershaft transmission 10 having a floating mainshaft, floating mainshaft gears and two substantially identical countershaft assemblies. This specific type of transmission is illustrated herein only to provide an environment for the present invention. Specific details of the transmission may be found in U.S. Pat. Nos. 3,105,395; 3,237,472; 3,283,613 and 4,034,620, all of which are hereby incorporated by reference. U.S. Pat. No. 3,237,472 discloses the transmission substantially as shown herein. U.S. Pat. No. 3,283,613 discloses the transmission as the main transmission section of a compound transmission used in combination with an auxiliary transmission section.

Transmission 10 includes a housing (not shown), an input shaft 12 supported by a bearing 14, an input gear 16 driven by the input shaft, a pair of substantially identical countershaft assemblies 18 and 18A, and a floating mainshaft assembly 20.

The countershaft assembly 18 includes a countershaft 22 which is rotatably supported at its right and left ends by bearings 24 and 26. The bearings allow free rotation of the shaft and prevent axial and radial movement thereof relative to the transmission housing as is well known in the prior art. Countershaft assembly 18A includes a countershaft 22A supported in the same manner by bearings 24A and 26A. Each of the countershafts is provided with one of a plurality of gears of identical size and function; these gears are fixed to rotate with their respective countershafts. Gears 28 and 28A are in mesh with the input gear 16, whereby the countershafts rotate at the same speed. Gear pairs 30-30A, 32-32A, 34-34A and 36-36A are forward ratio gears. Gear pairs 38-38A are reverse gears.

The floating mainshaft assembly 20 includes a mainshaft 40 having external splines 42 (see FIGS. 3-5) which extend for substantially the full length of the shaft. The right end of shaft 40 may be an output shaft or may provide the input to an auxiliary transmission section if transmission 10 is the main section of a compound transmission. The left end of shaft 40 is supported for rotational and radial movement in any known manner. Further details of the mainshaft mounting arrangement may be obtained from U.S. Pat. Nos. 3,105,395; 3,237,472; 3,283,613 and/or 3,500,695.

Five mainshaft drive gears 44, 46, 48, 50 and 52 encircle the mainshaft 40. Adjacent mainshaft gears 44, 46 and 48, 50 are positioned close together to reduce the length of the transmission. The input gear 16 and the mainshaft gears are selectively clutchable to the mainshaft 40, one at a time, by positive clutches 54, 56 and 58 which are slidably connected the mainshaft by internal splines. Each clutch includes jaws or external splines which mate with jaws or internal splines, such as splines 44A, 46A, 48A, 50A and 52A defined by gears 44, 46, 48, 50 and 52, respectively. The sliding clutches are moved into and out of engagement, one at a time, by partially shown shift forks 60, 62 and 64. The construction and manner of operation of the shift forks is well known. Mainshaft gear 44 is constantly meshed with gear pair 30-30A, mainshaft gear 46 is constantly meshed with gear pair 32-32A, mainshaft gear 48 is constantly meshed with gear pair 34-34A, mainshaft gear 50 is constantly meshed with gear pair 36-36A. Mainshaft gear 52 is constantly meshed with a pair of idler gears (not shown) which in turn are constantly meshed with countershaft gear pair 38-38A as is well known to provide a reverse speed mode of operation. The mainshaft drive gears, though encircling the mainshaft 40, are not radially supported thereon. Each gear is radially supported by the pair of countershaft gears (or idler gears) it is in mesh with, i.e. each of the mainshaft drive gears is free to float radially with respect to the mainshaft. The feature of floating the mainshaft and/or its gears provides a nearly equal torque split between the countershaft gears. This feature, which is well known, has greatly improved the wear life of the multiple substantially identical countershaft transmissions.

The mainshaft drive gears, 44, 46, 48, 50 and 52, when clutched to the mainshaft and when under load, are quite often acted on by substantial forces acting along the direction of the mainshaft axis. The precise reasons or causes for the axial forces are not fully understood and the direction of the forces along the axis is not totally predictable. The forces often manifest between the engaged splines of the gear and its clutch. When the forces appear between the splines, they often act in a direction tending to disengage the clutch from the gear splines. However, sometimes the forces act in a direction tending to further engage the clutch with the gear splines. Regardless of where the forces manifest, they tend to move the gear axially along the axis of the mainshaft; hence, gear retainers are needed to react the forces and prevent such movement. However, if the forces are reacted by gear and retainer surfaces rotating at a different speed, the forces cause wear and sometimes premature failure of the surfaces.

Figure 2:
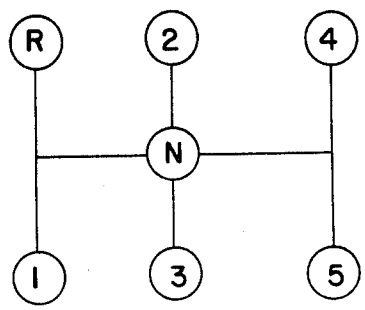
FIG. 2 is a schematic illustration of the shift pattern for the transmission, of transmission section, of FIG. 1.

The shift pattern for the five forward speed one reverse speed transmission 10 illustrated in FIG. 1 may be seen schematically by reference to FIG. 2.

The features of placing two mainshaft gears close together to reduce transmission length and floating the mainshaft gears to equalize the torque split of the countershaft gear pairs have been recognized for years as significant advancement in the transmission art. However, these advancements have, at the same time, complicated the design of durable gear retainers for preventing axial movement of the closely spaced and radially floating mainshaft gears, since the gear retainers are confined to a relatively small space and at times must react against relatively high axial forces tending to move the gears axially. Certain of the prior art gear retainers have been subject to the problem of wear, overheating and premature failure due to high stresses acting on surfaces rotating at different speeds. The gear retainer structure illustrated and described in U.S. Pat. No. 4,034,620 previously mentioned, substantially solves the problem of premature wear as all surfaces reacting against relatively high forces will rotate or tend to rotate at the same speed. However, that structure involves relatively complicated retainer means components and once assembled renders disassembly of the closely axially spaced mainshaft gear pair difficult and/or impossible. Hence, if such a structure is utilized, a failure of one gear may result in the requirement that both gears be replaced.

Figure 3:
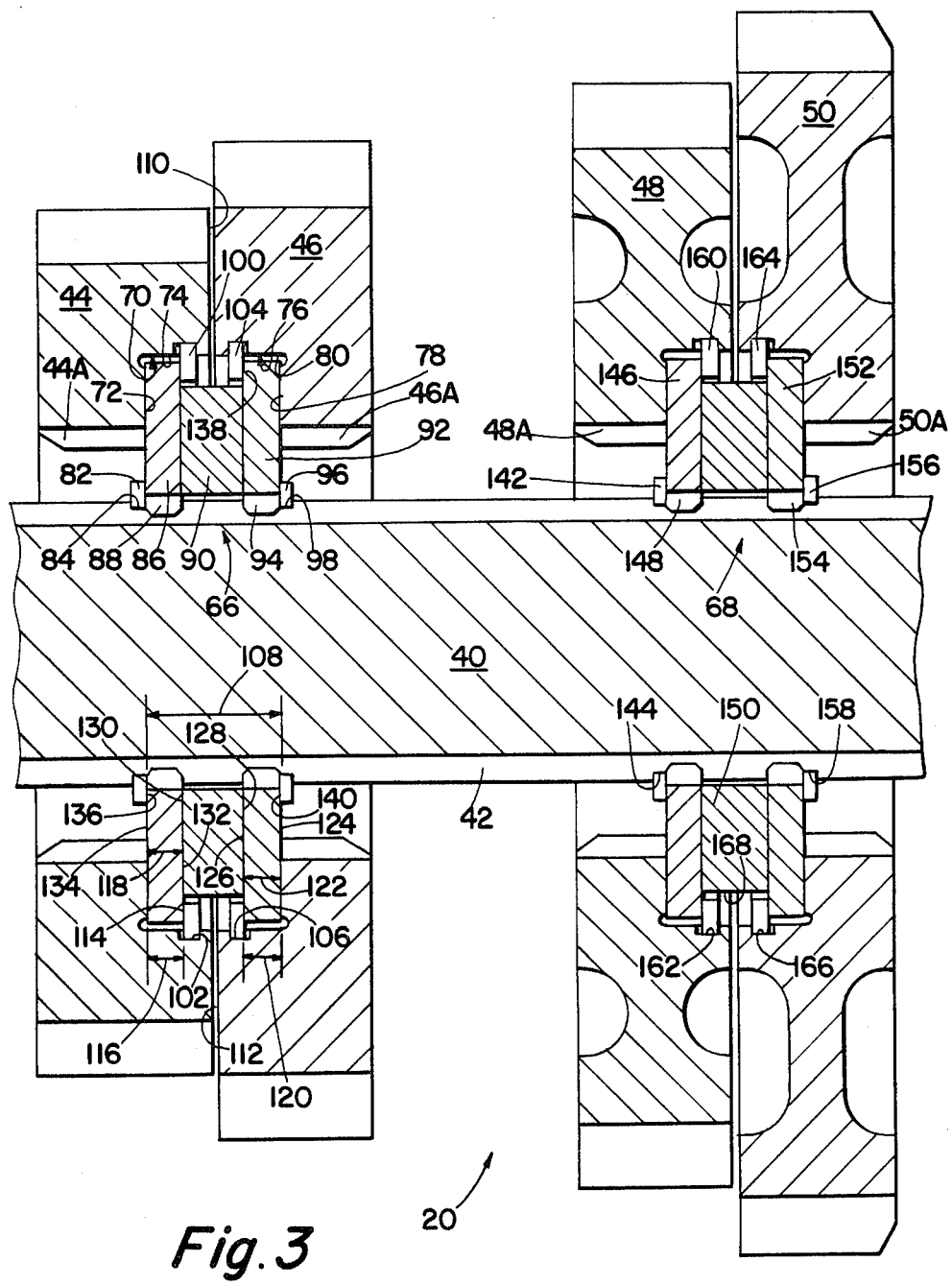
FIG. 3 is a partial sectional view of the mainshaft assembly of the transmission of FIG. 1 illustrating the improved gear retaining means of the present invention.

Looking now at FIG. 3, the mainshaft assembly 20 is illustrated in detail. Mainshaft gear 52 and the sliding clutches 54, 56 and 58 are not illustrated in FIG. 3 for purposes of simplifying the illustration. As may be seen, mainshaft 40 has external splines 42 which may extend along substantially the full length thereof. Mainshaft splines 42 are, of course, substantially parallel to the internal splines 44A, 46A, 48A, and 50A defined by the mainshaft gears 44, 46, 48, 50 and 52, respectively, surrounding the mainshaft 40. Mainshaft gears 44 and 46 and mainshaft gears 48 and 50 each comprise a pair of closely axially spaced radially floating mainshaft gears. Gear retainer means 66 axially retains the closely spaced pair of mainshaft gears 44 and 46 relative to mainshaft 40. Gear retainer means 68 axially retains the closely spaced pair of mainshaft gears 48 and 50 relative to mainshaft 40. Gear retainer means 66 and 68 are substantially identical and preferably are formed from common components for ease of manufacturing and inventory, etc.

Gear 44 is provided with a rightwardly facing pocket 70 defined by a radially extending surface 72 and an inner diameter surface 74. Mainshaft gear 46 is provided with a leftwardly facing pocket 76 defined by radially extending surface 78 and inner diameter surface 80.

Retainer assembly 66 is generally received within the annular space defined by axially facing pockets 70 and 76. Retainer means 66 includes external snap ring 82 received in an annular circumferential 84 formed in splines 42 of mainshaft 40, a thrust washer 86 having internal splines 88 engaged with mainshaft splines 42, a spacer ring 90, a thrust washer 92 having splines 94 engaged with mainshaft splines 42 and an external snap ring 96 disposed in circumferential groove 98 cut into spline 42. As may be seen, snap ring 82 retains thrust washer 86, spacer ring 90 and thrust washer 92 against leftward axial movement while snap ring 96 retains thrust washer 92, spacer ring 90 and thrust washer 86 against rightward axial movement relative to mainshaft 40. Spacer ring 90 may be free to rotate relative to the mainshaft as is shown or may be splined thereto within the scope of the present invention.

Preferably, snap rings 82 and 96 are identical and thrust washers 86 and 92 are identical.

Retainer means 66 also includes an internal snap ring 100 retained in a groove 102 formed in internal diameter surface 74 of gear 44 and an internal snap ring 4 carried in an annular groove 106 formed in internal diameter surface 80 of gear 46.

Thrust washers 86 and 92 are preferably identical and have an outer diameter which is less than the inner diameter of inner diameter surfaces 74 and 80 permitting radial movement of gears 44 and 46 relative to mainshaft 40. Thrust washer 86, spacer ring 90 and thrust washer 92 have a combined axial width 108 which is greater than the sum of the axial separation of radially extending surface 72 from the rightward end face 110 of gear 44 and the axial separation of radially extending surface 78 from the leftward end face 112 of gear 46. Accordingly, opposed end faces 110 and 112 of gears 44 and 46, respectively, will not abut and thus not be subject to wear when rotating at different rotational speeds under load.

In its rightwardmost position, the leftward end face 114 of snap ring 100 is axially spaced from radially extending surface 72 by a distance 116 which is slightly greater than the axial thickness 118 of thrust washer 86. In its leftwardmost position, snap ring 104 is axially spaced from radially extending surface 78 by a distance 120 which is slightly greater than the axial thickness 122 of thrust washer 92. For example, distances 116 and 120 exceed thicknesses 118 and 122, respectively, by about 0.005 inches.

The operation of gear retaining means 66, and of gear retaining means 68 which is substantially identical thereto, may be appreciated by consideration of the following example: Assuming, for purposes of illustration, that gear 46 has been clutched to mainshaft 40 by leftward axial movement of sliding clutch 56. When mainshaft gear 46 is so clutched to mainshaft 40, the mainshaft 40, mainshaft gear 46, snap ring 104, thrust washer 92, spacer ring 90, thrust washer 86 and snap ring 82 will rotate or tend to rotate at the same rotational speed as the loaded gear 46. It is understood that members are considered to rotate with mainshaft 40 if splined thereto and/or if free to rotate therewith. In the event of an axial force tending to move the clutched gear 46 towards the unclutched gear 44, i.e. a leftwardly directed axial force on gear 46, such an axial force will be reacted to the mainshaft 40 in the following manner: leftwardly facing radially extending surface 78 of gear 46 will bear upon the rightwardly facing end face 124 of thrust washer 92 causing the leftwardly facing end face 126 of thrust washer 92 to bear upon the rightwardly facing end face 128 of spacer ring 90 which will cause the leftwardly facing end face 130 of spacer ring 90 to bear upon the rightwardly facing end face 132 of thrust washer 86 which will result in the leftwardly facing end face 134 of thrust washer 86 bearing on snap ring 82 which will react the forces directly to the mainshaft 40. It may be seen that the various reacting surfaces, namely, 78-124, 126-128, 130-132 and 134-136 are all rotating, or tending to rotate, at the same speed, thus reducing wear on the various components of the gear retaining means and on the gears.

In the event of a rightward axial force on gear 46 tending to separate the clutched gear 46 from the unclutched gear 44, such a reaction force is reacted to the mainshaft 40 in the following manner: rightwardly facing end face 138 of internal snap ring 104 will bear against leftwardly facing end face 126 of thrust washer 92 causing rightwardly facing end face 124 of thrust washer to bear on the leftwardly facing end face 140 of snap ring 96 which will react the axial force directly to mainshaft 40. It may again be seen that the various reacting surfaces, namely, 138-126 and 124-140 are rotating, or tending to rotate, at the same rotational speed which speed is the speed of the mainshaft and the clutched gear. When gear 44 is clutched to mainshaft 40, gear retaining means 66 will react axial forces from gear 44 to mainshaft 40 in a similar manner. Gear retainer 68, which is substantially identical to gear retainer means 66, will react axial forces from the clutched one of gears 48 or 50 in a substantially identical manner also and will thus not be described in detail herein.

Briefly, gear retaining means 68 includes a snap ring 142 contained in an annular groove 144 provided in splines 42, a thrust washer 146 splined to mainshaft 40 at spline 148, a spacer ring 150, a thrust ring 152 splined to mainshaft 40 at splines 154 and a snap ring 156 received in an annular groove 158 provided in the mainshaft splines 42. Gear retaining means 68 also includes a snap ring 160 carried in an annular groove 162 provided in gear 48 and a snap ring 164 provided in an annular groove 166 provided in gear 50.

Spacer rings 90 and 150 have an outer diameter 168 which is less than the inner diameter of snap rings 100, 104, 160 and 164. Preferably, the radial clearance between the outer diameter surfaces of spacer washers 90 and 150 and the inner diameter surfaces of snap rings 100 and 104, 160 and 164, respectively, is sufficient to allow radial movement of the mainshaft gears relative to the mainshaft but not sufficient to allow unintended removal of the internal snap rings, such as by popping out of the grooves in which they are received due to high axial forces or the like.

As mentioned, previously, an important feature of the improved gear retaining means 66 and 68 is the relative simplicity of the components thereof. As may be seen, snap rings 82, 96, 142 and 156 are standard external snap rings while snap rings 100, 104, 160 and 164 are standardly available internal snap rings. Thrust washers 86, 92, 146 and 152 are simply disc shaped washer members having internal splines formed therein. In the preferred embodiment, all thrust washers within a given transmission will be identical. The spacer ring 90 and 150 are simply disc shaped members which may or may not be splined.

Another important feature of the improved gear retaining means of the present invention is the ease of assembling and disassembling mainshaft assemblies. To assemble closely spaced mainshaft gears 44 and 46 to mainshaft 40 from the leftward end of mainshaft 40, snap ring 96 is assembled to groove 98, a thrust washer 92 is preassembled to gear 46 by means of snap ring 104 received in groove 106, the gear 46-thrust washer 92-snap ring 104 subassembly is slid rightwardly on external spline 42 until thrust washer 92 engages snap ring 98, spacer ring 90 is slid rightwardly over mainshaft 40 until it engages thrust washer 92, a thrust washer 86 is assembled to gear 44 by means of snap ring 100 received in groove 102, the gear 44-thrust washer 86-snap ring 100 subassembly is slid over splines 42 until thrust washer 86 engages spacer 90 and then snap ring 82 is assembled to groove 84 to complete the assembly operation. To disassemble the gear pair 44 and 46 from mainshaft 40, snap ring 82 is removed from groove 84 and slid leftwardly off mainshaft 40, the mainshaft gear 44-thrust washer 86-snap ring 100 subassembly is slid leftwardly off of the mainshaft, spacer washer 90 is slid leftwardly off the mainshaft, mainshaft gear 46-thrust washer 92-snap ring 104 subassembly is slid leftwardly off the mainshaft and then snap ring 96 may be removed from circumferential groove 98. Of course, both the closely spaced pair of mainshaft gears 44-46 and mainshaft gears 48-50 may be assembled and/or disassembled from either end of the mainshaft. Additionally, only one gear of each pair need be removed for servicing purposes and the like.

It may also be seen that both of the gear 44-thrust washer 86-internal snap ring 100 and gear 46-thrust washer 92-internal snap ring 104 subassemblies are assembled to and disassembled from the mainshaft assembly as separate preassembled subassemblies.

Figure 4:
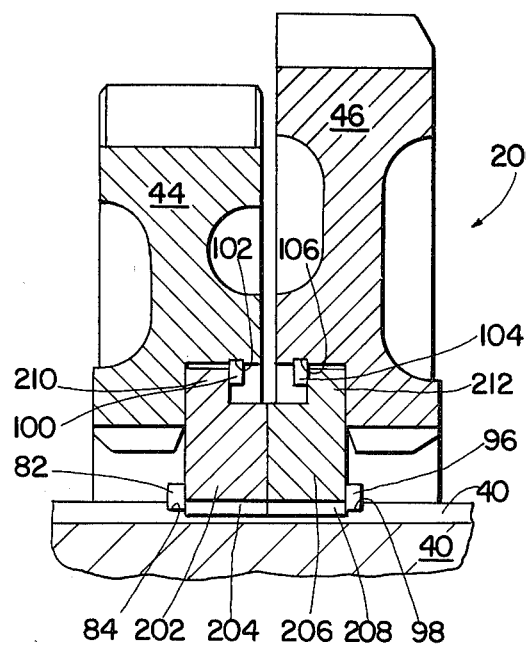
FIG. 4 is a partial sectional view illustrating an alternate embodiment of the improved gear retaining means of the present invention.

An alternate embodiment of the present invention may be seen by reference to FIG. 4. In FIG. 4, an alternate embodiment 200 of a gear retaining means is utilized to axially retain closely spaced mainshaft gears 44 and 46 to mainshaft 40, to allow radial movement of mainshaft gears 44 and 46 relative to mainshaft 40 and to react axial forces on gears 44 and 46 to mainshaft 40. Gears 44 and 46 are substantially identical to gear 44 and 46 described above in connection with gear retainer means 66. Gear retainer means 200 includes a snap ring 82 received in a groove 84 provided in splines 42 of mainshaft 40, a thrust washer 202 splined to mainshaft 40 by splines 204, a thrust washer 206 splined to mainshaft 40 by splines 208, and a snap ring 96 received in an annular groove 98 provided in the splines 42 of mainshaft 40. Gear retaining means 200 also includes a snap ring 100 received in an annular groove 102 formed in surface 74 of gear 44 and a snap ring 104 received in an annular groove 106 formed in surface 80 of gear 46. Snap ring 100 engages radially outwardly extending flange portion 210 of thrust washer 202 and snap ring 104 engages a radially outwardly extending flange portion 212 of thrust ring 206. Snap rings 100 and 104 permit a limited relative axial movement between the mainshaft gears 44 and 46 and the thrust washers 202 and 206, respectively, which relative axial movement is in the range of about 0.005 inches. The operation of gear retaining means 200 is similar to that of gear retainer 66 and 68 described above. Briefly, assuming gear 46 is clutched to the mainshaft for rotation therewith, leftward axial forces on mainshaft gear 46 will be reacted to mainshaft 40 in the following manner: mainshaft gear 46 will bear upon thrust washer 206 which will in turn bear upon thrust washer 202 which will in turn bear upon snap ring 82 which will in turn react the axial forces directly to the mainshaft 40. When mainshaft gear 46 is clutched to mainshaft 40, the mainshaft 40, mainshaft gear 46, snap ring 96, thrust washer 206, thrust washer 202 and snap ring 82 will all be rotating, or tending to rotate, at the same rotational speed, namely the rotational speed of the mainshaft and mainshaft gear 46. Rightward axial forces will be reacted from mainshaft gear 46 to mainshaft 40 in the following manner: mainshaft gear 46 will react on snap ring 104 which will react on thrust washer 206 which will react on snap ring 96 which will react the rightward axial forces directly to mainshaft 40. It is noted that when mainshaft gear 46 is clutched to mainshaft 40, mainshaft 40, mainshaft gear 46, snap ring 104, thrust washer 206 and snap ring 96 are all rotating or tending to rotate at the same rotational speed, namely the rotational speed of the mainshaft and clutched mainshaft gears.

Mainshaft gears 44 and 46 may be quickly and easily assembled to, or disassembled from, mainshaft 40 from either end of mainshaft 40 by simply sliding the mainshaft gear 46-thrust washer 206-snap ring 104 subassembly and the mainshaft gear 44-thrust washer 202-snap ring 102 subassembly on or off the mainshaft prior to or after disassembly or assembly, respectively, of the snap ring 82 or 96 onto the mainshaft. It is noted that both the gear 46-washer 206-snap ring 104 subassembly and the gear 44-washer 202 snap ring 102 subassembly may be independently assembled and disassembled as a preassembled subassembly from the mainshaft assembly 20.

Figure 5:
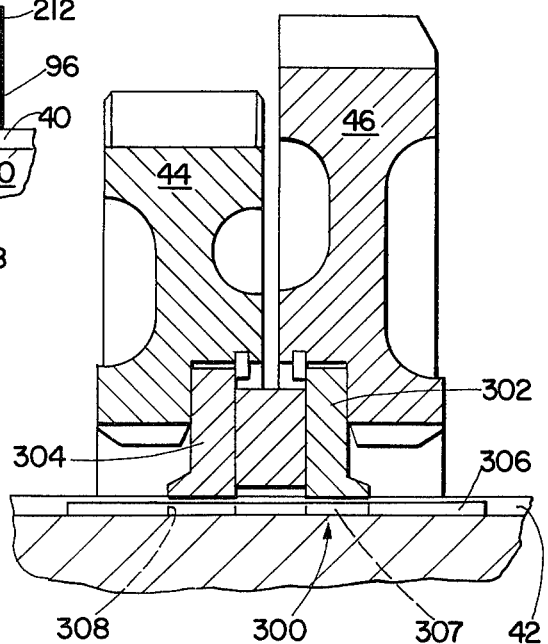
FIG. 5 is a partial sectional view illustrating another alternate embodiment of the improved gear retaining means of the present invention.
Figure 6:
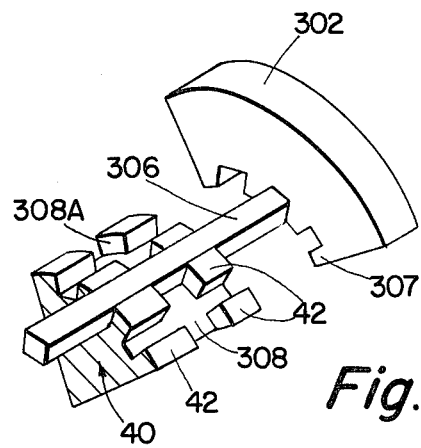
FIG. 6 is an exploded perspective view of a portion of the alternate embodiment of FIG. 5.

A further alternate embodiment of the present invention may be seen by reference to FIG. 5. In FIG. 5, a gear retaining means 300 is utilized to assemble closely spaced mainshaft gears 44 and 46 to mainshaft 40. Gear retainer means 300 is identical in structure and function to gear retaining means 66 and 68 discussed above, except that snap rings 82 and 96 are not utilized and the thrust washers 302 and 304 are axially retained by means of a key 306 as will be described below and by reference to FIG. 6. Briefly, thrust washers 302 and 304 include internal splines 307 which allow the washers to slide along the mainshaft 40 to relatively wide circumferential grooves 308 formed therein. Grooves 308 have a width slightly greater than the axial length of internal splines 307. The thrust washers are then rotated circumferentially relative to mainshaft 40 by a rotational distance equal to one spline whereby the internal spline teeth of the thrust washers will align with the external spline teeth 42 of the mainshaft. The thrust washers are then locked against rotatation relative to the mainshaft by insertion of the key 306. The shoulders 308A of grooves 308 will engage splines 307 to axially locate thrust washers 302 and 304 on shaft 40. This method of axially retaining washers and the like on splined shafts is well known in the prior art and may be seen by reference to U.S. Pat. No. 4,034,620 mentioned above.

The preferred embodiment of the present invention has been disclosed for illustrative purposes. Various modifications and arrangements of parts may be resorted to without departing from the spirit and the scope of the invention as hereinafter claimed.

We claim:

1. A change gear transmission of the type having a mainshaft, first and a second radially floating mainshaft gears encircling said mainshaft and axially positioned close together, a plurality of substantially identical countershafts having countershaft gears supporting said mainshaft gears and driving said mainshaft gears at different relative rotational speeds, and clutch means selectively operative to clutch said mainshaft gears to said mainshaft one at a time;

said first mainshaft gear axially spaced from said second mainshaft gear in a first axial direction, said first mainshaft gear defining a first pocket therein defined by a first radially extending thrust surface axially facing said second gear and a first inner diameter surface, said second mainshaft gear defining a second pocket therein facing said first gear defined by a second radially extending thrust surface facing said first gear and a second inner diameter surface; and thrust means axially fixed to said mainshaft and rotatable therewith for axially retaining said first and second mainshaft gears relative to said mainshaft, said thrust means comprising; thrust washer means rotatable with said mainshaft, means to axially fix said thrust washer to said mainshaft, said means to axially fix said thrust washer means to said mainshaft rotatable with said mainshaft and permitting assembly and disassembly of said thrust washer means from said mainshaft from either axial direction on said mainshaft, said thrust washer means defining a third radially extending thrust surface engageable by said first thrust surface and a fourth thrust surface engageable by said second thrust surface, said third and fourth radially extending thrust surfaces having an axial separation preventing engagement of said first and second mainshaft gears, means interconnecting said first mainshaft gear to said thrust washer means to limit axial movement of said first mainshaft gear in the first axial direction relative to said thrust washer means and means axially interconnecting said second mainshaft gear to said thrust washer means to limit axial movement of said second mainshaft gear relative to said thrust washer means, said thrust washer means received generally in the space defined by said first and second pockets and having an outer diameter surface less than the inner diameter of said first and second inner diameters surfaces whereby said thrust washer means will allow radially floating movement of said mainshaft gear relative to said mainshaft.

2. The transmission of claim 1, wherein said thrust washer means comprises a first thrust washer carrying said third thrust surface and a second thrust washer carrying said fourth thrust surface.

3. The transmission of claim 2, further comprising a spacer axially interposed said first and second thrust washers.

4. The transmission of claims 2 or 3, wherein said means to axially interconnect said first mainshaft gear and said first thrust washer comprises an internal snap ring received in a groove formed in said first inner diameter surface and said means to interconnect said second mainshaft gear with said second thrust washer comprises a second internal snap ring received in an annular groove formed in said second inner diameter surface.

5. The transmission of claim 4, wherein said first thrust washer defines a fifth radially extending thrust surface facing said second gear, said first internal snap ring engaging said fifth thrust surface and said second thrust washer defines a sixth thrust surface facing said first gear, said second internal snap ring engaging said sixth thrust surface.

6. The transmission of claim 4, wherein said first gear, said first thrust washer and said first internal snap ring define a first subassembly which may be assembled to and removed from said mainshaft as an independent subassembley and said second gear, said second thrust washer and said second internal snap ring define a second subassembly which may be assembled to and removed from said mainshaft as an independent subassembly.

7. The transmission of claim 3, wherein said means to axially interconnect said first mainshaft gear and said first thrust washer comprises an internal snap ring received in a groove formed in said first inner diameter surface and said means to interconnect said second mainshaft gear with said second thrust washer comprises a second internal snap ring received in an annular groove formed in said second inner diameter surface, said spacer having an outer diameter smaller than the inner diameter of said internal snap rings when said internal snap rings are received and retained in said grooves but larger than the inner diameter of said internal snap rings when said internal snap rings are resiliently deformed sufficiently for removal from said grooves.

8. The transmission of claim 7, wherein said first gear, said first thrust washer and said first internal snap ring define a first subassembly which may be assembled to and removed from said mainshaft as an independent subassembley and said second gear, said second thrust washer and said second internal snap ring define a second subassembly which may be assembled to and removed from said mainshaft as an independent subassembly.

9. Gear retaining means for a transmission of the type having a mainshaft, a first and a second floating mainshaft gears encircling said mainshaft and axially positioned close together, a plurality of countershafts having countershaft gears supporting said mainshaft gears and driving said mainshaft gears at different relative rotational speeds, and clutch means selectively operative to clutch said mainshaft gears to said mainshaft one at a time, said first mainshaft gear having a first pocket formed therein defined by a first radially extending surface facing said second gear and a first inner diameter surface, said second mainshaft gear having a second pocket formed therein defined by a first radially extending thrust surface facing said first mainshaft gear and a second inner diameter surface, said gear retaining means received generally in the annular space defined by said first and second pockets and adapted to react axial forces on a clutched one of said mainshaft gears toward or away from the unclutched mainshaft gear to the mainshaft through thrust surfaces rotating at the same rotational speed at the mainshaft, said gear retaining means comprising a first generally disc shaped thrust washer rotatable with said mainshaft and defining a third radially extending thrust surface axially engageable with and facing said first thrust surface, a second generally disc shaped thrust washer rotatable with said mainshaft and defining a fourth radially extending thrust surface axially facing and engageable with said second thrust surface, means for axially fixing said first thrust washer relative to said mainshaft in at least the axial direction towards said first mainshaft gear, means for axially fixing said second thrust washer relative to said mainshaft in at least the axial direction towards said second mainshaft gear, spacer means interposed said first and second thrust washers for maintaining said third and fourth thrust surfaces at an axial separation sufficient to prevent axial engagement of said first and second mainshaft gears, means assemblable and disassemblable to said first inner diameter surface and engageable with a surface on said first thrust washer opposite said third thrust surface to limit axial movement of said first mainshaft gear in the axial direction away from said second mainshaft gear and means assemblable and disassemblable in said second inner diameter surface and engageable with a thrust surface on said second thrust washer opposite said fourth thrust surface to limit axial movement of said second mainshaft gear in the axial direction away from said first mainshaft gear.

10. The retaining means of claim 9, wherein said first and second thrust washers are splined to said mainshaft for rotation therewith.

11. The gear retaining means of claims 9 or 10, wherein said means assemblable to said first and second inner diameter surfaces comprise first and second internal snap rings received in internal grooves provided in said first and second inner diameter surfaces, said first thrust washer axially interposed said first thrust surface and said first internal snap ring and said second thrust washer axially interposed said second thrust surface and said second internal snap ring.

12. The gear retaining means of claim 11, wherein said spacer is a tube like structure having an outer diameter slightly less than the nondeformed inner diameter of said internal snap rings whereby said mainshaft gears are free to float radially relative to said mainshaft but said internal snap rings are prevented from inward radial deformation sufficient to disengage said snap rings from the internal grooves when said spacer member is assembled between said thrust washers.

13. The gear retainer of claim 12, wherein said means for retaining said thrust washers relative to said mainshaft comprising exterior snap rings received in external grooves provided in said mainshaft.

14. Gear retaining means of claim 11, wherein said first mainshaft gear, said first thrust washer and said first interior snap ring may be assembled and disassembled from said mainshaft as an independent subassembly and said second mainshaft gear, second thrust washer and said second interior snap ring may be assembled and disassembled from said mainshaft as an independent subassembly.

15. The gear retaining means of claim 14, wherein said first and second thrust rings are substantially identical.

16. The gear retaining means of claim 9, wherein said mainshaft is provided with axially extending splines extending along the length thereof and said thrust washers are provided with mating internal splines.

17. The gear retainer of claim 9, wherein said spacer comprises a reduced diameter sleeve formed integrally with at least one of said first and second thrust washers.

* * * * *